(12) United States Patent
Kim

(10) Patent No.: US 11,428,467 B2
(45) Date of Patent: Aug. 30, 2022

(54) FACILITY FOR FORMING WOOD PLASTIC COMPOSITE WITH MICROWAVE AND DEGASSING DEVICE

(71) Applicants: NEXT-GEN GRAPHENE POLYMERS CO., LTD, Seoul (KR); A-1 GREEN TECH, INC, Los Angeles, CA (US)

(72) Inventor: Jong-soo Kim, Seoul (KR)

(73) Assignees: NEXT-GEN GRAPHENE POLYMERS CO., LTD, Seoul (KR); A-1 GREEN TECH, INC, Los Angeles, CA (US)

( * ) Notice: Subject to any disclaimer, the term of this patent is extended or adjusted under 35 U.S.C. 154(b) by 265 days.

(21) Appl. No.: 16/843,480

(22) Filed: Apr. 8, 2020

(65) Prior Publication Data

US 2021/0318064 A1 Oct. 14, 2021

(51) Int. Cl.
*F26B 3/347* (2006.01)
*B29B 13/06* (2006.01)
*B29B 13/00* (2006.01)

(52) U.S. Cl.
CPC ............ *F26B 3/347* (2013.01); *B29B 13/065* (2013.01); *B29B 2013/005* (2013.01); *F26B 2210/16* (2013.01)

(58) Field of Classification Search
CPC .. F26B 3/347; B29B 13/065; B29B 2013/005
USPC ........................................................ 34/255
See application file for complete search history.

(56) References Cited

U.S. PATENT DOCUMENTS

| 4,773,168 | A | * | 9/1988 | Lamos | ................... | B29C 48/793 |
| | | | | | | 34/174 |
| 5,513,445 | A | * | 5/1996 | Farrag | ..................... | B29C 49/42 |
| | | | | | | 34/582 |
| 6,449,875 | B1 | * | 9/2002 | Becker | .................... | F26B 21/12 |
| | | | | | | 34/550 |

(Continued)

FOREIGN PATENT DOCUMENTS

| EP | 1818637 A3 * | 6/2009 | ............ B01D 53/04 |
| EP | 2539373 B1 * | 9/2019 | ......... B01D 17/0205 |

(Continued)

*Primary Examiner* — Stephen M Gravini
(74) *Attorney, Agent, or Firm* — Kile Park Reed & Houtteman PLLC

(57) ABSTRACT

The present disclosure relates to a facility for forming a wood plastic composite by mixing and extruding wood powder and a polymer resin. According to a facility of the present disclosure, in a process of forming a wood plastic composite, gas and water vapor contained in wood powder and polymer resin are efficiently removed, and thus, a coupling force between wood powder and polymer resin increases, and also, wood powder is uniformly dispersed inside polymer resin, and thus, physical properties of a wood plastic composite to be formed is not degraded, and in addition, since there is no stagnant section while molten liquid of wood powder and polymer resin passes through each apparatus in the facility, wood powder is prevented from carbonizing or polymer resin is prevented from solidifying, and thus, physical properties of the wood plastic composite to be formed are maintained constant.

11 Claims, 9 Drawing Sheets

(56) References Cited

U.S. PATENT DOCUMENTS

| | | | | |
|---|---|---|---|---|
| 6,584,701 | B1* | 7/2003 | Brown | F26B 17/1408 |
| | | | | 34/169 |
| 7,662,211 | B2* | 2/2010 | Federico | B01D 53/04 |
| | | | | 96/115 |
| 8,141,270 | B2* | 3/2012 | Gera, Jr. | F26B 21/04 |
| | | | | 34/493 |
| 9,039,811 | B2* | 5/2015 | Eisinger | B01D 19/001 |
| | | | | 95/271 |
| 11,203,133 | B2* | 12/2021 | Bessemer | F26B 21/04 |
| 2010/0217445 | A1* | 8/2010 | Moretto | B29B 13/065 |
| | | | | 700/282 |
| 2010/0229420 | A1* | 9/2010 | Garrido | F26B 25/22 |
| | | | | 34/493 |
| 2011/0283554 | A1* | 11/2011 | Kuhnau | F26B 23/04 |
| | | | | 34/79 |
| 2016/0151936 | A1* | 6/2016 | Maguire | B29B 13/065 |
| | | | | 34/412 |
| 2021/0318064 | A1* | 10/2021 | Kim | B29C 48/763 |

FOREIGN PATENT DOCUMENTS

| | | | | |
|---|---|---|---|---|
| JP | 11237266 A | * | 8/1999 | G01F 1/6845 |
| KR | 10-2009-0030419 | | 3/2009 | |
| KR | 10-0971999 | | 7/2010 | |
| KR | 10-2011-0024346 | | 3/2011 | |
| KR | 10-2012-0044213 | | 5/2012 | |
| KR | 10-1575574 | | 12/2015 | |

* cited by examiner

FACILITY FOR FORMING WOOD PLASTIC COMPOSITE WITH MICROWAVE AND DEGASSING DEVICE

BACKGROUND

1. Field

The present disclosure relates to a facility for forming a composite by mixing and extruding wood powder and a polymer resin, and particularly, to a facility for forming a wood plastic composite that enables wood powder and a polymer resin to be coupled to each other by effectively separating and discharging gas, water vapor, and so on generated during a process of forming the composite.

2. Description of the Related Art

Wood, which is a nature-friendly material, has an advantage of providing a high strength and visual beauty and has been widely used in various fields including building materials for a long time but has a disadvantage in that logging destroys environment, the wood is vulnerable to pests and has a risk of fire, and strength of the wood is weakened due to rot by moisture, and thus, new materials to replace the wood are required.

Accordingly, plastic, which is easily processed, is light, has excellent insulation or insulation effects, and may compensate for shortcomings of the wood, has been developed and occupies a larger share than wood in an industrial field.

Plastic materials have been widely used due to excellent moldability, productivity, and uniform quality, but the plastic materials have a disadvantage in that the plastic materials are not environment-friendly because of no decomposition and are weak to heat and external impact.

Accordingly, in order to compensate for the disadvantage of wood and plastic materials and to utilize the advantage, a wood plastic composite has been developed in which a wood material and plastic are combined as a coupling agent that reacts simultaneously with hydrophilicity and hydrophobicity.

The wood powder used as a main raw material of the wood plastic composite has a variety of species, and rice husk, rice straw, and so on, which contain plant fibers, are also used, and thermoplastic plastic is mainly used as plastic, and among the materials, polyolefin resins such as, polyethylene (PE) and polypropylene (PP), which have a melting point lower than approximately 210° C. at which wood powder begins to decomposed by heat, are mainly used as a matrix of the wood plastic composite.

The polyolefin resins, such as, polyethylene and polypropylene, are thermoplastic polymers with a very low glass transition temperature, and are relatively inexpensive, and have excellent chemical resistance, water resistance, insulation, and various physical properties through copolymerization with other materials.

Accordingly, nowadays, a composite mixed with wood powder-based fillers in which olefin-based plastics and wood, a hardboard, and pulp are crushed to a certain size is injection-molded or extruded to be widely used in furniture, building materials, components manufacture, and so on.

However, the polyolefin resins are hydrophobic, whereas cellulose which is a main component of wood powder is hydrophilic, and thus, the materials are not easily compounded, and when the materials are mixed and molded, a coupling strength at an interface between both materials is reduced resulting in degradation of mechanical properties, a change in dimension due to expansion due to moisture and so on, and weakness of physical properties.

In addition, wood powder contains moisture of 5.5 to 5.9% even after hot air drying, and thus, when a wood plastic composite is prepared by mixing with a polymer resin, the wood powder aggregates within the composite to cause physical properties to be degraded, and this acts as an obstacle to form the wood plastic composite using an injection molding method or an extrusion molding method.

In order to solve this problem, Korea Patent Publication No. 2011-0024346 proposes a gas discharge nozzle machine for discharging gas containing water vapor to the outside during injection molding, a vortex ring is installed inside a nozzle of an injection machine, the vortex ring has an inner diameter of an outlet portion is smaller than an inner diameter of an inlet portion, a curved surface is formed at a point where the inlet portion meets the outlet portion, and thus, vortex is generated while a molten raw material passes through the vortex ring.

The present disclosure provides an effect that a molten raw material is uniformly mixed due to a vortex phenomenon and gas contained in the raw material is smoothly discharged in the process, while the vortex phenomenon hinders a flow of the molten raw material, and thus, there is a problem that efficiency of an injection molding operation is reduced.

In addition, Korea Patent Registration No. 0971999 discloses an injection machine capable of effectively removing gas components contained in a molten resin, the injection machine heats and melts a resin raw material in a heating cylinder and transports the resin raw material to a nozzle assembly under pressure, the molten resin passes through a narrow gap of the nozzle assembly while being thinly spread to generate more gas from the molten resin and then discharged to the outside, and thus, gas is removed from the molten resin as much as possible.

However, in this method of removing gas, since the molten resin has to pass through the narrow gap of the nozzle assembly, a high pressure is applied in the narrow gap where the gas is generated, the high pressure molten resin blocks a path through which the gas is discharged, and thus, the gas is not smoothly discharged.

SUMMARY

The present disclosure is to solve the above-described problems and provides a facility for forming a wood plastic composite capable of removing gas and water vapor contained in wood powder and a polymer resin as much as possible in a process of mixing and extruding the wood powder and the polymer resin and capable of uniformly dispersing the wood powder inside the polymer resin.

According to an aspect of the present disclosure, a facility for forming a wood plastic composite includes an extruder 100 that melts a polymer resin and extrudes the melted polymer resin; a side feeder block 200 that combines wood powder with the polymer resin extruded from the extruder 100 and extrudes the combined wood powder and polymer resin to the outside; a heater 300 that is installed on outer circumferential surfaces of the extruder 100 and the side feeder block 200 to heat the polymer resin and the wood powder; a filter assembly 400 that receives the powder and the polymer resin extruded from the side feeder block 200 and discharges gas generated from a molten liquid of the wood powder and the polymer resin to the outside; a wood powder drying apparatus 500 that dries the wood powder and supplies the dried wood powder to the side feeder block 200; and an air purification apparatus 600 that removes harmful components in the gas discharged from the filter assembly 400 and the wood powder drying apparatus 500 and discharges clean gas to the outside.

In this case, the filter assembly 400 may include a housing 16 that has one side on which the molten liquid supply portion 27 is mounted and through which the molten liquid is supplied, and that includes a gas intake 14 and a gas outlet 12; a gas separation portion 20 that is disposed in a longitudinal direction in a hollow formed inside the housing 16 and has multiple flow channels 18 and 34 formed on a surface thereof in a diagonal shape in the longitudinal direction so as to discharge gas contained in the molten liquid in a process in which the molten liquid flows through the flow channels 18 and 34 in a diagonal direction; multiple vent rings 22 that are tightly coupled to an outer circumferential surface of the gas separation portion 20 to seal radially outer openings of the flow channels 18 and 34 and thereby preventing the molten liquid from leaking so that the molten liquid flows in the longitudinal direction and the gas contained in the molten liquid is discharged through a micro path; and a head 24 that is coupled to the other side of the housing 16 to discharge the molten liquid passing through the gas separation portion 20 and presses the multiple vent rings 22 to come into close contact with each other.

According to a facility for forming a wood plastic composite of the present disclosure, during a process of forming a wood plastic composite, gas and water vapor contained in wood powder and polymer resin are efficiently removed, and thus, a coupling force between the wood powder and the polymer resin increases, and also, the wood powder is uniformly dispersed inside the polymer resin, and thus, physical properties of a wood plastic composite to be formed is not degraded.

In addition, since there is no stagnant section while molten liquid of the wood powder and the polymer resin passes through each apparatus in the facility, it is possible to prevent the wood powder from carbonizing or the polymer resin from solidifying, and thus, physical properties of the wood plastic composite to be formed are maintained constant.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
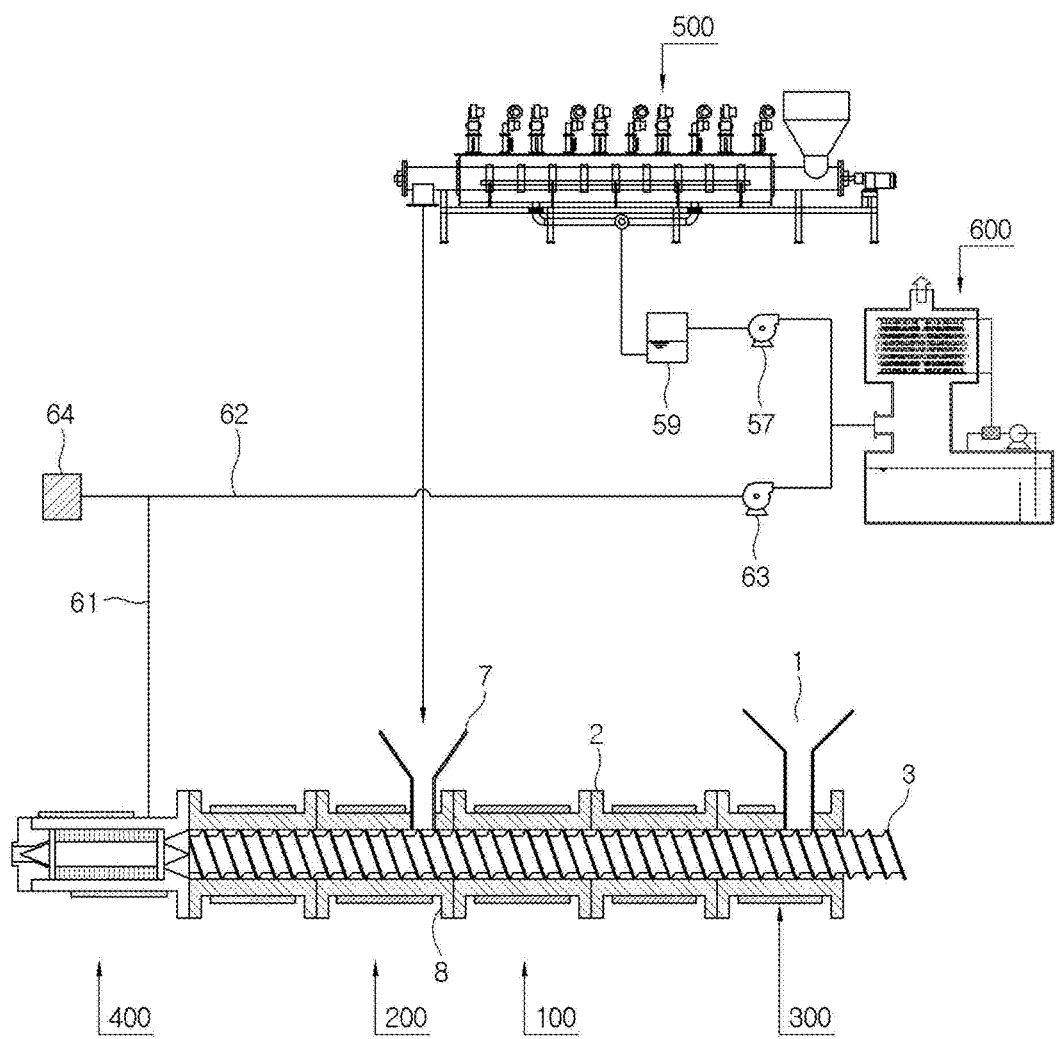
FIG. 1 is a view illustrating a facility for forming a wood plastic composite according to the present disclosure.
Figure 2:
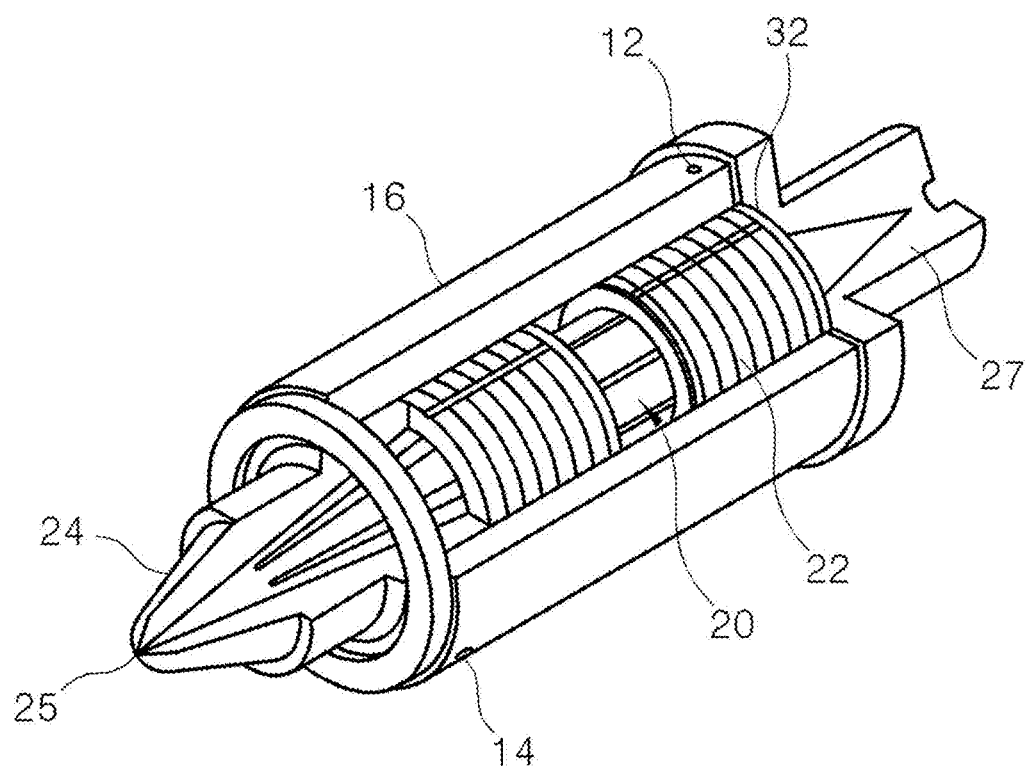
FIG. 2 is a partially cut perspective view illustrating an internal structure of a filter assembly.

A facility for forming a wood plastic composite according to the present disclosure will be described in detail with reference to the accompanying drawings.

It should be noted that, in adding reference numerals to configuration elements of each drawing, the same configuration elements are denoted by the same reference numerals as possible even though the configuration elements are illustrated in other drawings.

In addition, in describing the present disclosure, when it is determined that detailed description on related well-known structures or functions may obscure the subject matter of the present disclosure, the detailed description will be omitted.

FIG. 1 schematically illustrates a facility for forming a wood plastic composite according to the present disclosure.

As illustrated in FIG. 1, a facility for forming a wood plastic composite according to the present disclosure includes an extruder 100 that melts a polymer resin and extrudes the melted polymer resin to a side feeder block 200; the side feeder block 200 that supplies wood powder to the polymer resin extruded from the extruder 100, mixes the polymer resin with the wood powder, and extrudes the mixture to a filter assembly 400; a heater 300 that is installed on outer circumferential surfaces of the extruder 100 and the side feeder block 200 to heat the polymer resin and the wood powder; a filter assembly 400 that discharges the wood powder extruded from the side feeder block 200 and gas generated from the polymer resin to the outside; a wood powder drying apparatus 500 that dries the wood powder and supplies the dried wood powder to the side feeder block 200; and an air purification apparatus 600 that removes harmful components from the gas discharged from the filter assembly 400 and the wood powder drying apparatus 500 and discharges clean gas to the outside.

The extruder 100 includes a polymer resin hopper 1 that contains a polymer resin, a body 2 having a path through which the polymer resin moves, and an extruder screw 3 that is included in a polymer resin movement path in the body 2, receives the polymer resin from the polymer resin hopper 1, melts the polymer resin by using heat of the heater 300, and extrudes the melted polymer resin to the side feeder block 200.

FIG. 1 illustrates a single screw extruder having one extruder screw 3, and it is also possible to use a twin-screw extruder having two extruder screws 3.

The side feeder block 200 includes a side feeder block inlet 7 for containing the wood powder dried by the wood powder drying apparatus 500, and a side feeder block body 8 having a path through which wood powder and a polymer resin move.

The extruder screw 3 extends inside the side feeder block body 8 and the heater 300 is installed on an outer circumferential surface of the side feeder block body 8, and thus, the polymer resin extruded from the extruder 100 and the wood powder supplied from the side feeder block inlet 7 are mixed, melted by heating of the heater 300, and then extruded to the filter assembly 400.

As described above, since the polymer resin is first heated by the heater 300 of the extruder 100 and then the wood powder is mixed with the heated polymer resin in the side feeder block 200, the wood powder is mixed with the polymer resin in a molten state such that the wood powder and the polymer resin may be mixed more uniformly, and also the wood powder may be prevented from being carbonized because the wood powder, which is easily carbonized, has a shorter heating time than the polymer resin.

When content of wood powder input to the facility according to the present disclosure is relatively large compared to content of a polymer resin, the wood powder and the polymer resin may not be uniformly mixed in the side feeder block 200, and in this case, the wood powder is also input to the polymer resin hopper 1 to be mixed with the polymer resin by extruder 100 a first time, and then the wood powder is additionally input to the side feeder block 200 to be mixed with the polymer resin a second time, and thus, the wood powder and the polymer resin may be mixed more uniformly.

In addition, as another method of uniformly mixing the wood powder and the polymer resin, the side feeder block 200 may be additionally installed in series in a flow direction of the wood powder and the polymer resin, and as the wood powder is divided and input to the polymer resin, content of the wood powder may increase more than content of the polymer resin.

FIGS. 2 to 8 illustrate a structure of the filter assembly 400, the filter assembly 400 removes gas (including water vapor) contained in the wood powder and the polymer resin (hereinafter, referred to as "molten liquid" which are melted to make the wood powder and the polymer resin be well fused to each other and are mounted on an output side of the side feeder block 200.

The filter assembly 400 includes a housing in which a gas outlet 12 and a gas intake 14 are formed; a gas separation portion 20 that is disposed in a longitudinal direction in a hollow formed inside the housing 16 and has multiple molten liquid flow channels 18 and 34 formed on a surface thereof in a diagonal shape in the longitudinal direction so as to make the molten liquid flow through the molten liquid flow channels 18 and 34 under a certain pressure to discharge gas; multiple vent rings 22 that are tightly coupled to an outer circumferential surface of the gas separation portion 20 to seal the radially outer openings of the molten liquid flow channels 18 and 34 thereby preventing a molten liquid from leaking so that the molten liquid flows in the longitudinal direction and the gas contained in the molten liquid is discharged through a gap t; and a head 24 that is coupled to the other side of the housing 16 to discharge the molten liquid passing through the gas separation portion 20 and presses the multiple vent rings 22 to come into close contact with each other.

The housing 16 has a hollow formed in the longitudinal direction therein and a molten liquid supply portion 27 formed at a rear end 18*b* thereof to be coupled to an output side of the side feeder block 200, and thus, the molten liquid ejected from the side feeder block 200 is supplied to the gas separation portion 20 through the molten liquid supply portion 27.

The housing 16 has a front end that may be screwed to the head 24, and the gas separation portion 20 is disposed in a hollow formed inside the housing 16, and thus, gas contained in the molten liquid is separated and discharged.

The gas separation portion 20 includes a main body 28; the multiple molten liquid flow channels 18 and 34 which are formed concavely on an outer circumferential surface of the main body 28 in a diagonal direction and in the longitudinal direction and through which molten liquid flows; and a support plate 32 that is radially disposed at one side end of the main body 28 and has multiple inflow hole 30 formed at regular intervals in a circumferential direction and corresponds to the multiple molten liquid flow channels 18 and 34 to cause the molten liquid supplied through the molten liquid supply portion 27 to be supplied to the molten liquid flow channels 18 and 34 through the inflow holes 30.

The main body 28 has a cylindrical shape, a first wedge W1 protrudes on one side (in a direction of the side feeder block 200) thereof, and a second wedge W2 protrudes on the other side (in a direction of the head 24) thereof.

As the first wedge W1 protrudes in the direction of the side feeder block 200, the molten liquid ejected from the side feeder block 200 may be supplied to the gas separation portion 20 in a properly dispersed state in a process of being transported along the conical first wedge W1.

In addition, multiple molten liquid flow channels 18 and 34 are formed on an outer circumferential surface of the main body 28 at a certain depth and are formed to be inclined at a certain angle in the longitudinal direction, that is, in a diagonal direction, and thus, the molten liquid flows through the molten liquid flow channels 18 and 34.

The multiple molten liquid flow channels 18 and 34 includes first flow channels 18 that are formed concavely in the diagonal direction on a surface of the main body 28; second flow channels 34 that alternate with the first flow channels and are arranged side by side and adjacent to the first flow channels 18 to cause the molten liquid overflow; and flow channel protruding jaws 35 which protrude between the first and second flow channels 18 and 34 to distinguish the first and second flow channels 18 and 34 and have overflow holes h formed at peaks P thereof to enable the molten liquid of the first flow channels 18 to overflow to the second flow channels 34, and the multiple first and second flow channels 18 and 34 and the flow channel protruding jaws 35 are arranged alternately and repeatedly along a circumferential surface of the main body 28.

Since the first and second flow channels 18 and 34 are formed concavely at a certain depth from the surface of the main body 28, molten liquid flows in a direction of the head 24 along the molten liquid flow channels 18 and 34, and at this time, since the multiple vent rings 22 are tightly coupled to the outer circumferential surface of the main body 28 of the gas separation portion 20, the radially outer openings 19 of the multiple molten liquid flow channels 18 and 34 are sealed by the vent rings 22.

Accordingly, the molten liquid may flow through inner spaces of the multiple molten liquid flow channels 18 and 34 without leakage, and in this process, gas contained in the molten liquid may be discharged, pass through spaces between the multiple vent rings 22 coupled to the outside of the main body 28, and be discharged to the outside.

In more detail, an opening is formed at the rear end 18*b* of the first flow channel 18 to correspond to the inflow hole 30 of the support plate 32, an inclined surface S is formed at a front end 18*a*, the inclined surface S is formed at a rear end 34*b* of the second flow channel 34, an opening is formed at a front end 34*a*, and thus, the molten liquid is ejected to the head 24.

The support plate 32 disposed on one side of the main body 28 has a disc shape and includes the multiple inflow holes 30 disposed in a circumferential direction thereof, and thus, molten liquid supplied under pressure from the side feeder block 200 flows into the multiple first flow channels 18 through the inflow holes 30 of the support plate 32 and flows to the front end 18a.

The molten liquid flowing to the front end 18a of the first flow channel 18 reaches the inclined surface S and then is blocked by an inner circumferential surface of the vent ring 22, and at this time, the molten liquid flowing along the first flow channel 18 overflows to the adjacent second flow channel 34 through the overflow hole h because the flow channel protrusion jaw 35 formed between the first flow channel 18 and the second flow channel 34 adjacent to each other has a smaller diameter than an imaginary circular arc formed along the circumferential surface of the main body 28.

At this time, a part of the molten liquid reaching the inclined surface S of the first flow channel 18 may be ejected in the direction of the head 24 through a micro ejection hole 33 formed in the inclined surface S, and as such, a part of the molten liquid may be ejected through the micro ejection hole 33.

Accordingly, the molten liquid flowing through the molten liquid flow channels 18 and 34 may be prevented from leaking into the gap t of the vent ring 22 or from clogging the gap t due to an excessive pressure, and also, there is an effect that wood powder is prevented from carbonizing and the polymer resin is prevented from solidifying due to stagnation of the molten liquid on the inclined surface S.

Figure 6:
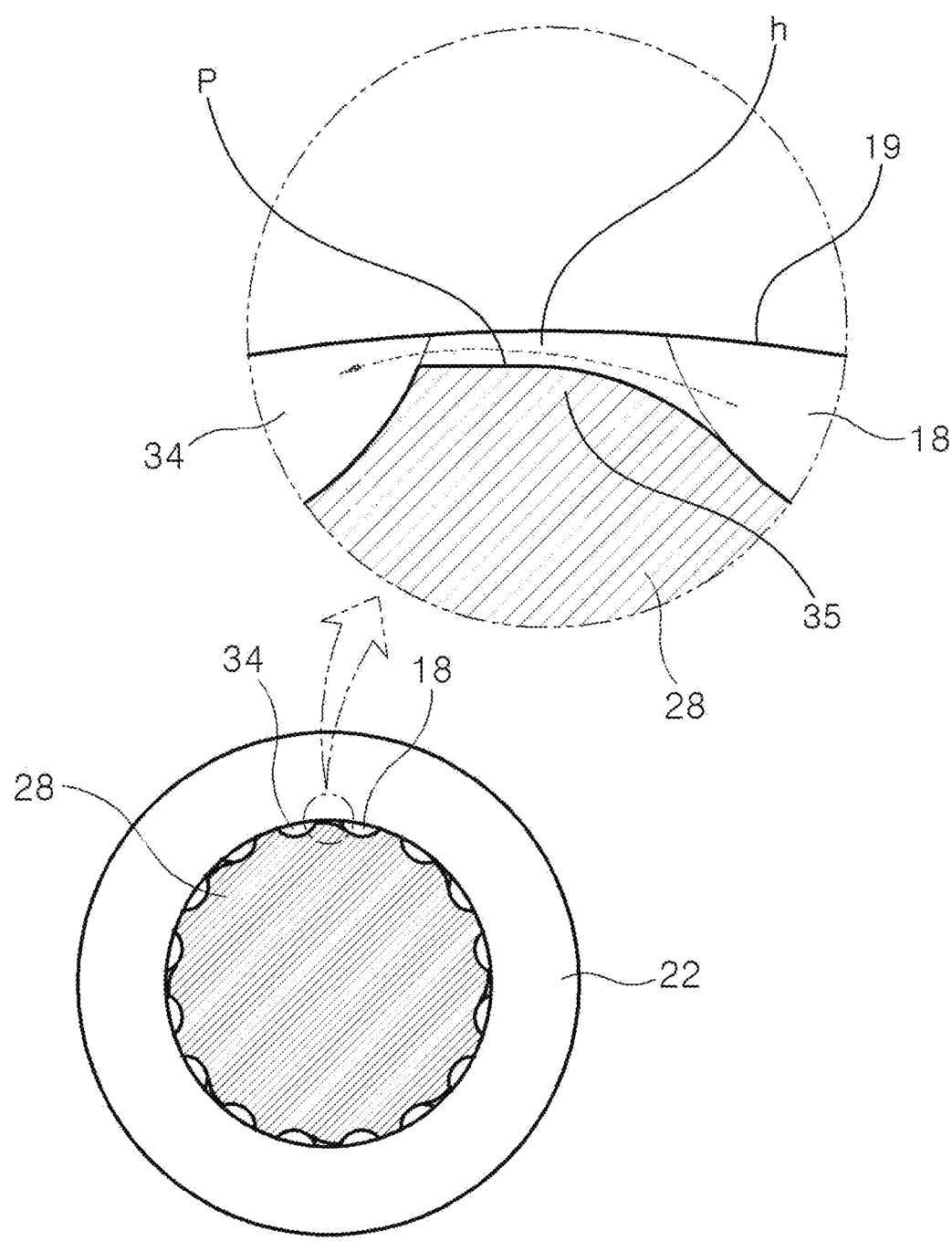
FIG. 6 is an enlarged view illustrating a connection structure between a first flow channel and a second flow channel of the gas separation portion illustrated in FIG. 3.

In addition, as illustrated in FIG. 6, the molten liquid passes to the adjacent second flow channel 34 through the overflow hole h formed in the flow channel protruding jaw 35, the molten liquid passes in a stretched state of a thin thickness because the path of the overflow hole h is narrow so that the gas contained in the molten liquid may be effectively discharged, and also, the wood powder contained in the molten liquid is uniformly distributed in the molten liquid.

In addition, since the molten liquid flow channels 18 and 34 are diagonal, the path of the overflow hole h may be formed to be longer compared to a case of a straight line shape, and thus, a larger amount of the molten liquid may pass through the gas separation portion 20 for a unit time, and since the time when the molten liquid flows through the diagonal molten liquid flow channels 18 and 34 increases compared to the case of the straight line shape, the time when the gas contained in the molten liquid may be discharged becomes longer, and thus, the gas contained in the molten liquid may be effectively discharged from the gas separation portion 20.

The molten liquid overflowing to the second flow channel 34 is transported to the head 24 along the second wedge W2 through the opening at the front end 34a of the second flow channel 34, and then, is extruded to a die or a mold through a nozzle 25, and the molten liquid flows along the conical second wedge W2, and thus, the molten liquid may be ejected more effectively.

Since the molten liquid flowing along the molten liquid flow channels 18 and 34 is under a certain pressure, the gas generated from the molten liquid is discharged to the outside through the multiple vent rings 22 coupled to the outside of the main body 28.

Figure 3:
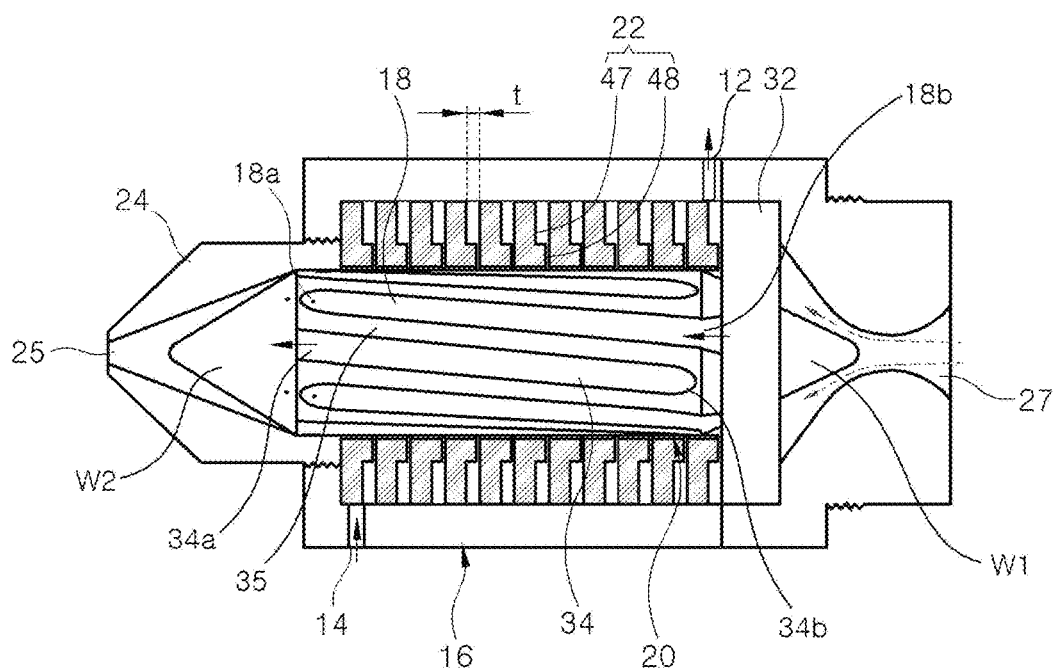
FIG. 3 is a cross-sectional view illustrating the internal structure of the filter assembly illustrated in FIG. 2.
Figure 4:
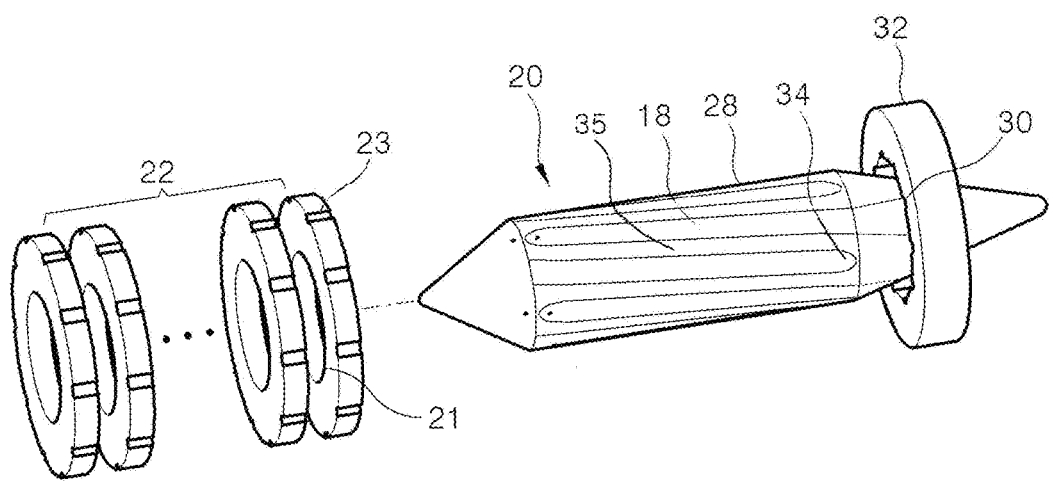
FIG. 4 is a perspective view illustrating a structure in which a vent ring is coupled to a gas separation portion illustrated in FIG. 3.
Figure 5:
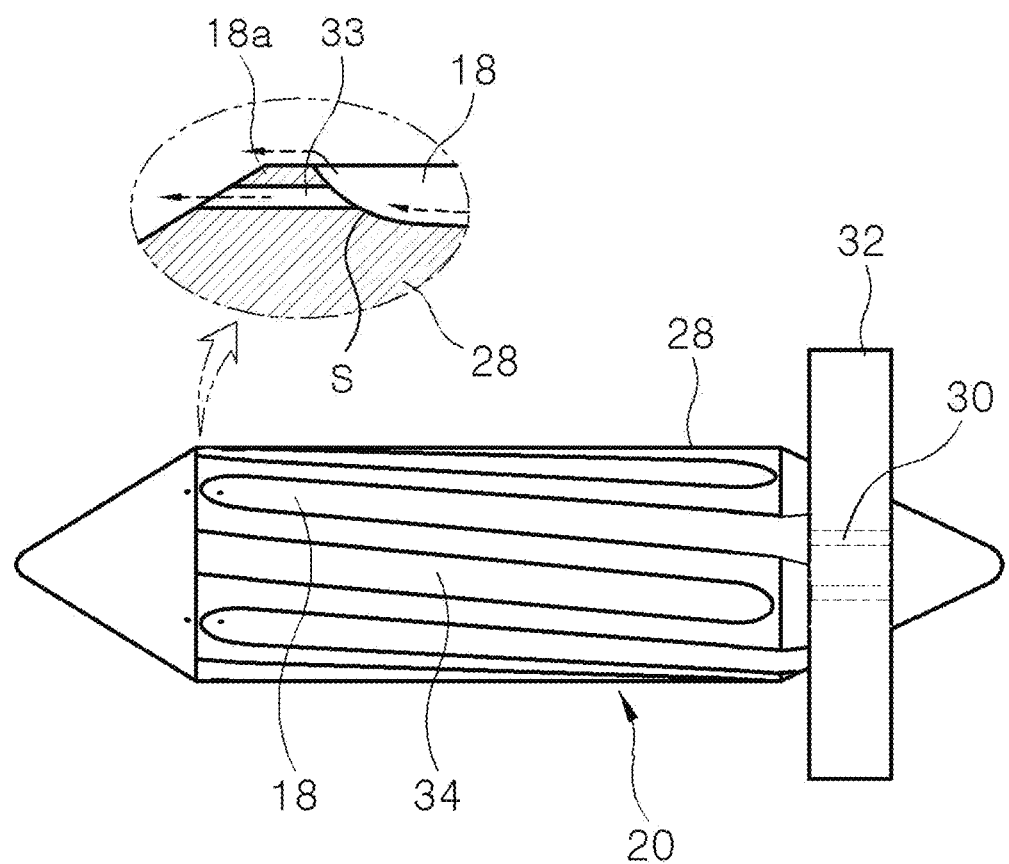
FIG. 5 is a view illustrating a structure of a micro ejection hole formed at a front end of the gas separation portion of FIG. 3.

As illustrated in FIGS. 3 and 4, the vent ring 22 has a circular ring shape and includes an insertion hole 21 inside a radius; a first protruding jaw 48 that protrudes on a front surface of the vent ring 22 in a circumferential direction around the insertion hole 21, has a radial micro path formed on a surface thereof, and is in contact with a rear surface of the adjacent vent ring 22; and a gas discharge groove 23 that is formed concavely on a circumferential surface of the vent ring 22 in a longitudinal direction to become a gas discharge path.

The main body 28 of the gas separation portion 20 is inserted into the insertion hole 21 to enable the vent ring 22 to be coupled to the main body 28, and an inner circumferential surface of the insertion hole 21 of the vent ring 22 is tightly coupled to an outer circumferential surface of the main body 28 of the gas separation portion 20, and thus, the multiple molten liquid flow channels 18 and 34 are sealed.

The micro path formed in the first protruding jaw 48 has a size through which gas passes and the molten liquid does not pass, and thus, the molten liquid passing through the gas separation portion 20 overflows from the first flow channel 18 to the second flow channel 34 through the overflow hole h, and the gas generated from the molten liquid is discharged through the micro path formed in the first protruding jaw 48.

The first protruding jaw 48 is formed to protrude in a lateral direction of the vent ring 22 so as to come into contact with a rear surface of the adjacent vent ring 22, and thus, a gas collection groove 47 having a predetermined distance between rims of the adjacent vent rings 22 is formed, and the gas discharged through the micro path of the first protruding jaw 48 is collected in the gas collection groove 47.

Figure 7:
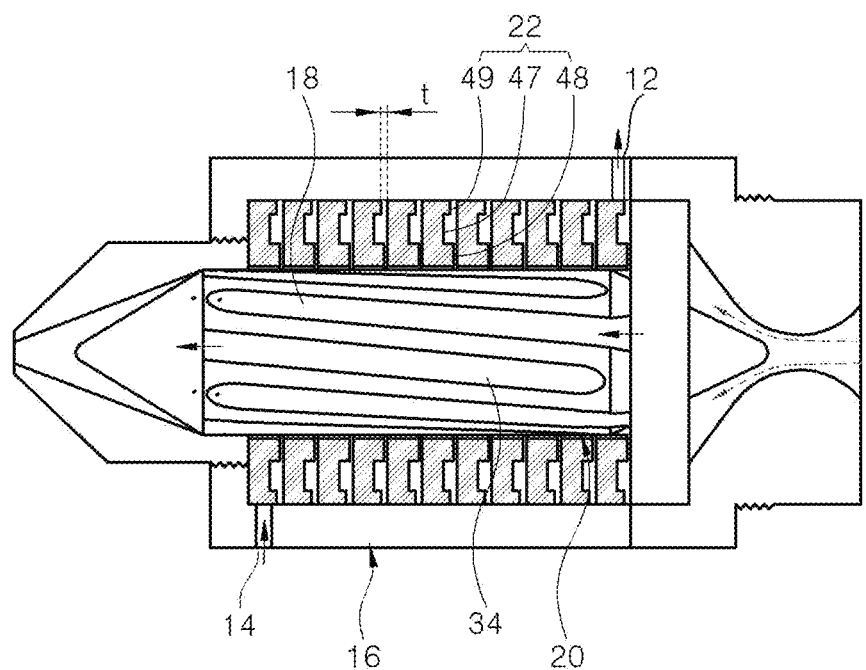
FIG. 7 is a side surface view illustrating another embodiment of the vent ring illustrated in FIG. 3.

In order to increase a gas discharge effect, a structure of the vent ring 22 may be appropriately changed, and as illustrated in FIG. 7, a second protruding jaw 49 may be additionally formed on the vent ring 22, the second protruding jaw 49 is formed to protrude on a front side of the vent ring 22 in a circumferential direction around the rim of the vent ring 22 and is disposed at a regular interval from the first protruding jaw 48, and a protruding length thereof is smaller than a protruding length of the first protruding jaw 48.

Accordingly, the second protruding jaw 49 is not in contact with a rear surface of the adjacent vent ring 22, the gas collection grooves 47 is formed between the first and second protruding jaws 48 and 49 while forming a constant gap t, and thus, gas discharged from the molten liquid flow channels 18 and 34 passes through the micro path of the first protruding jaw 48 to be collected in the gas collection groove 47 and then discharged to the outside through the gap t.

At this time, multiple gas discharge grooves 23 are concavely formed at a certain depth on a circumferential surface of the vent ring 22, these gas discharge grooves 23 are disposed at regular intervals from each other along the rim, and the gas discharge grooves 23 formed in the respective vent rings 22 are aligned in the longitudinal direction in the same line as the gas discharge grooves 23 of the adjacent vent rings 22.

Accordingly, the gas collected in the gas collection grooves 47 of the respective vent rings 22 passes through the gap t and flows into the gas discharge grooves 23, and then, passes through the gas discharge grooves 23 of the adjacent vent rings 22 aligned on the same line and may be effectively discharged to the outside through a gas outlet 12 formed in the housing 16 through the gas discharge grooves 23.

Figure 8:
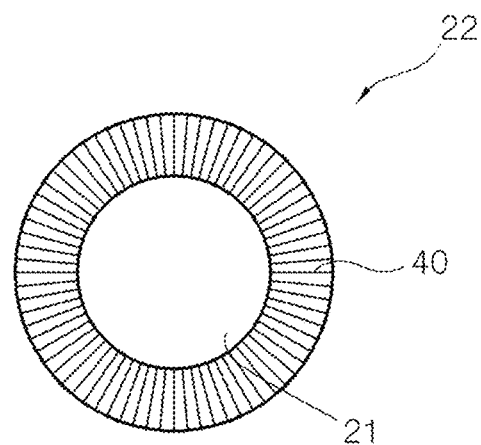
FIG. 8 is a view illustrating yet another embodiment of the vent ring illustrated in FIG. 3.

Although it is described above that the gas collection grooves 47 are formed in the vent rings 22, the present disclosure is not limited to this, may be changed, and micro grooves 40 may be formed on the entire front surface of the vent ring 22 as illustrated in FIG. 8.

That is, without forming the gas collection grooves 47 in the front surface of the vent ring 22, multiple micro grooves 40 may be formed in a radially outer direction around the insertion hole 21 of the vent ring 22, and it is preferably form a width or depth of the micro groove 40 to be a size, for example 0.001 to 0.100 mm, through which gas passes and molten liquid does not pass in the same manner as in the micro path formed in the first protruding jaw 48 of the vent ring 22, and the micro groove 40 may be formed in various shapes such as a straight line shape and a curved shape.

In order to discharge the gas more effectively, the gas intake 14 may be disposed on the opposite side of the gas outlet 12 of the housing 16, and it is preferable to dispose the gas intake 14 and the gas outlet 12 to be spaced apart from each other as far as possible around the longitudinal direction of the housing 16.

The gas intake 14 is opened to external air to enable the air to be sucked in or is connected to a container storing inert gas depending on the type of a polymer resin to be used to enable the inert gas to be sucked in, and thus, safety of the facility for forming a wood plastic composite according to the present disclosure may be secured.

The gas outlet 12 is connected to a vacuum pump 63, which will be described later, to transport air or inert gas to the air purification apparatus 600, and when air or inert gas flows into an internal space of the housing 16 through the gas intake 14 as described above, the gas discharged from the gas separation portion 20 may be effectively discharged from the inner space of the housing 16 by a suction force of the vacuum pump 63.

The head 24 is screwed to an outlet of the housing 16, and the nozzle 25 is formed at a front end of the head 24, the molten liquid passing through the second wedge W2 of the gas separation portion 20 is ejected to a die or a mold through the nozzle 25, and by mounting a pellet formation apparatus in an outlet of the nozzle 25, a wood plastic composite pellet is formed or injected into a mold to manufacture an injection product.

The filter assembly 400 configured as described above may be operated as follows.

Molten liquid extruded from the side feeder block 200 is supplied to the gas separation portion 20 through the first wedge W1, and the molten liquid flows along the conical first wedge W1, and thus, the molten liquid passes through multiple inflow holes 30 formed in the support plate 32 in a properly dispersed state.

At this time, the multiple inflow holes 30 correspond to the multiple first flow channels 18 formed on an outer circumferential surface of the main body 28 of the gas separation portion 20, and thus the molten liquid flows through the multiple first flow channels 18.

At this time, the multiple molten liquid flow channels 18 and 34 are formed in a diagonal direction to extend the time when the molten liquid passes through the gas separation portion 20, and thereby the time when the molten liquid stays in the gas separation portion 20 increases, and thus, a larger amount of gas may be discharged from the molten liquid.

The molten liquid flowing through the first flow channel 18 reaches the inclined surface S formed at the front end 18a, and the flowing of the molten liquid is blocked on the inclined surface S, and thus, the molten liquid overflows to the second flow channel 34 through the overflow hole h of the protruding jaw 35 formed between the adjacent second flow channels 34.

Since the overflow hole h has a narrow path, the molten liquid passes in a stretched state of a thin thickness, and thus, gas contained in the molten liquid may be effectively discharged, and since wood powder contained in the molten liquid is uniformly distributed over all, the wood powder is not aggregated in the molten liquid, and thus, physical properties of a wood plastic composite to be formed is excellent.

The molten liquid moved to the second flow channel 34 flows through the second flow channel 34, is discharged through an opening of the front end 34a, moves to the head 24 along the second wedge W2, and then is ejected to a die or a mold through the nozzle 25.

A part of the molten liquid reaching the inclined surface S of the first flow channel 18 may be ejected in the direction of the head 24 through the micro ejection hole 33 formed in the inclined surface S, and as such, a part of the molten liquid is ejected through the micro ejection hole 33 to prevent an excessive pressure from being applied to the molten liquid flowing through the first flow channel 18 so that the molten liquid is prevented from leaking into the gap t of the vent ring 22 or from clogging the gap t, and to prevent the wood powder from carbonizing or the polymer resin from solidifying due to stagnation of the molten liquid on the inclined surface S.

Since the molten liquid flowing through the oblique flow channels 18 and 34 is under a certain pressure, gas contained in the molten liquid passes through micro paths or gaps between the micro grooves 40 of the multiple vent rings 22 coupled an outer circumferential surface of the main body 28 to be collected in the gas collection groove 47, and then sequentially flows through the gas discharge grooves 23 of the vent rings 22 and thereafter, is discharged to the air purification apparatus 600 through the gas outlet 12 formed in the housing 16.

During this process, gas may be effectively removed from the molten liquid passing through the filter assembly 400.

The wood powder input to the facility for forming a wood plastic composite according to the present disclosure serves to increase physical properties of a composite and to make an appearance beautiful as a reinforcing material and a filling material of a wood plastic composite, wood powder obtained by crushing original wood or waste wood and then pulverizing the crushed wood by with a grinder is used, and it is preferable for the wood powder to have a size of 30 to 120 mesh for a smooth operation of the facility for forming a wood plastic composite.

The wood powder contains gas components, moisture, and so on, and during extrusion or injection molding of the wood powder and polymer resin, moisture vaporizes at a melting temperature of the resin to separate the wood powder from the resin at an interface of the wood powder together with the gas components, and due to this, interface coupling of the wood powder and the polymer resin is hindered to cause mechanical properties of a composite to be degraded, and thus, it is preferable to dry the crushed wood powder to remove moisture.

However, the wood powder usually contains moisture of 5.5 to 5.9% even when the wood powder is hot-air dried, and it is impossible to achieve a moisture content rate of 0.03% or less with a general hot air dryer, and when the moisture content rate of the wood powder is high, it is difficult to couple the wood powder to the polymer resin and physical properties of a wood plastic composite are degraded.

In addition, the filter assembly 400 performs a function of removing gas components and moisture from the molten liquid, and when there are much gas components and moisture content amount in the wood powder, the filter assembly 400 is heavily loaded to cause processing capacity of the facility for forming a wood plastic composite to be reduced, and also, the gas components and moisture content in the formed wood plastic composite are increased to cause mechanical properties of the composite to be degraded.

Accordingly, it is preferable to dry the wood powder to have moisture content of 0.01% or less so as to be mixed with a polymer resin, and more preferably to dry to 300 ppm or less, and to this end, it is preferable to dry the wood powder by using a wood powder drying apparatus 500 equipped with a microwave generator and then supply to the side feeder block 200.

A screw type may be used for drying a small amount of wood powder, and a rotary kiln type may be used for drying a large amount of wood powder as the wood powder drying apparatus 500.

Figure 9:
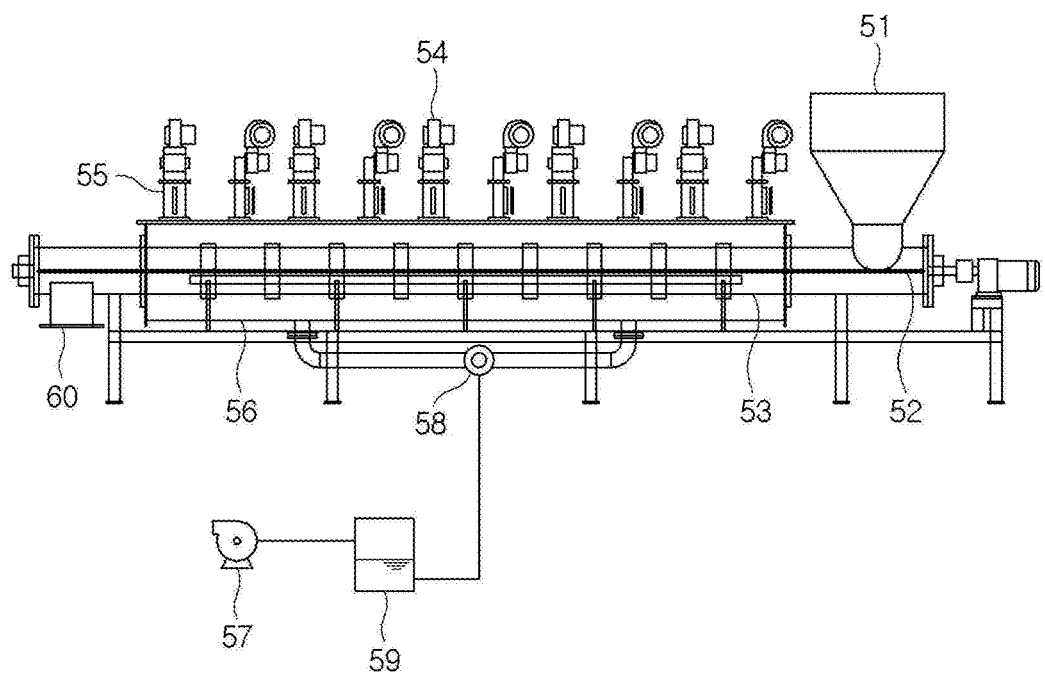
FIG. 9 is a view schematically illustrating a structure of a wood powder drying apparatus.

The wood powder drying apparatus 500 illustrated in FIG. 9 is the screw type, and includes a wood powder hopper 51 that contains wood powder; an alumina pipe 53 in which a movement path of wood powder is formed and an opening is formed in an upper portion; a transport screw 52 that is contained in a wood powder movement path of the alumina pipe 53 and receives wood powder from the wood powder hopper 51 to transport the wood powder; a drying housing 56 that contains the alumina pipe 53 therein and is connected to a drain pipe 58 in a lower portion thereof; a microwave generator 54 that generates microwaves and supplies the microwaves to the drying housing 56 through a waveguide 55; a drain tank 59 that is connected to the drying housing 56 through the drain pipe 58; a drying vacuum pump 57 that is connected to the drain tank 59 to discharge gas generated from wood powder to the outside; and a wood powder outlet 60 that is installed at a rear end of the alumina pipe 53 to discharge wood powder transported by the transport screw 52.

After wood powder is into the wood powder hopper 51, the wood powder is transported through the alumina pipe 53 by the transport screw 52, and at this time, power is supplied to the microwave generator 54 sequentially according to a wood feed transport speed to generate microwaves, and the microwaves are supplied to the drying housing 56 via the waveguide 55.

The microwaves are scattered in the drying housing 56 and pass through the alumina pipe 53 to reach the wood powder being transported by the transport screw 52 in the alumina pipe 53, energy of the microwaves causes a molecular motion of moisture contained in the wood powder, and temperatures of the wood powder and moisture increases due to kinetic energy generated in this way to separate impurities such as gas components, moisture, and lignin contained in the wood powder from the wood powder.

It is preferable to adjust a frequency of the microwaves to 2 to 5 GHz so that energy of the microwaves causes a molecular motion of moisture.

An inside of the drying housing 56 is vacuumed by the drying vacuum pump 57, and the impurities such as gas components, moisture, and lignin separated from the wood powder are collected in the drying housing 56 through the opening in an upper portion of the alumina pipe 53, and then, transported to the drain tank 59 through the drain pipe 58 by the drying vacuum pump 57, and thus, impurities such as lignin are precipitated in the drain tank 59.

Gas components and water vapor generated in a drying process of the wood powder are discharged from the microwave wood powder drying apparatus 500 to the air purification apparatus 600 by the drying vacuum pump 57.

The dried wood powder from which the impurities such as gas components, moisture, and lignin are removed is discharged through the wood powder outlet 60 and then transported to the side feeder block inlet 7 through a conveyor belt or a screw, and in order to prevent moisture from adsorbing during transport, the conveyor belt or a screw transport pipe is preferably configured in a close type.

A rotary kiln type wood powder drying apparatus is also configured in the same principle as the screw type to remove impurities such as gas components, moisture, and lignin contained in wood powder from the wood powder and then transports the wood power to the side feeder block inlet 7.

Gas discharged from the gas outlet 12 of the filter assembly 400 is discharged to the air purification apparatus 600 via a gas discharge pipe 61, a gas suction pipe 62, and the vacuum pump 63, wherein an air filter 64 for blocking foreign matter in an external air from being sucked in is connected to an end of the gas suction pipe 62, the vacuum pump 63 is connected to the other end thereof, and the gas discharge pipe 61 is coupled to the middle of the gas suction pipe 62 at right angles.

The external air is discharged to the air purification apparatus 600 through the air filter 64, the gas suction pipe 62, and the vacuum pump 63 by an operation of the vacuum pump 63, and as the air passes through the gas suction pipe 62 at a high speed, a negative pressure is formed in the gas discharge pipe 61 coupled to the gas suction pipe 61 at right angles according to Bernoulli's theorem, and thus, the negative pressure is also formed in the gas collection groove 47 coupled thereto.

Accordingly, gas collected in the gas collection groove 47 is quickly discharged to the air purification apparatus 600 via the gas discharge pipe 61, the gas suction pipe 62, and also acts as a suction force in the gas passing through the micro path or the micro groove 40 formed in the vent ring 22 of the gas separation portion 20 to smoothly discharge the gas generated from the molten liquid to the air purification apparatus 600.

In FIG. 1, the vacuum pump 63 is installed in a downstream end of the gas suction pipe 62 to suck gas, but it is also possible to install a blower in an upstream end of the gas suction pipe 62 instead of installing the vacuum pump 63, and a negative pressure is formed in the gas discharge pipe 61 by blowing of the blower in the same manner as the above-described principle to discharge gas of the gas separation portion 20 to the outside, and in this case, the blower does not come into direct contact with the gas discharged from the filter assembly 400, and thus, there is an advantage in that the blower is prevented from being corroded by the gas.

In addition, although FIG. 1 illustrates a configuration in which external air is introduced into the gas intake pipe 62 through the air filter 64, the gas discharge pipe without installing the air filter 64 and the gas intake pipe 62 as required 61) may be directly connected to the vacuum pump 63 to prevent external air from entering, and in this case, there is an effect of reducing the load of the air purification apparatus 600.

Figure 10:
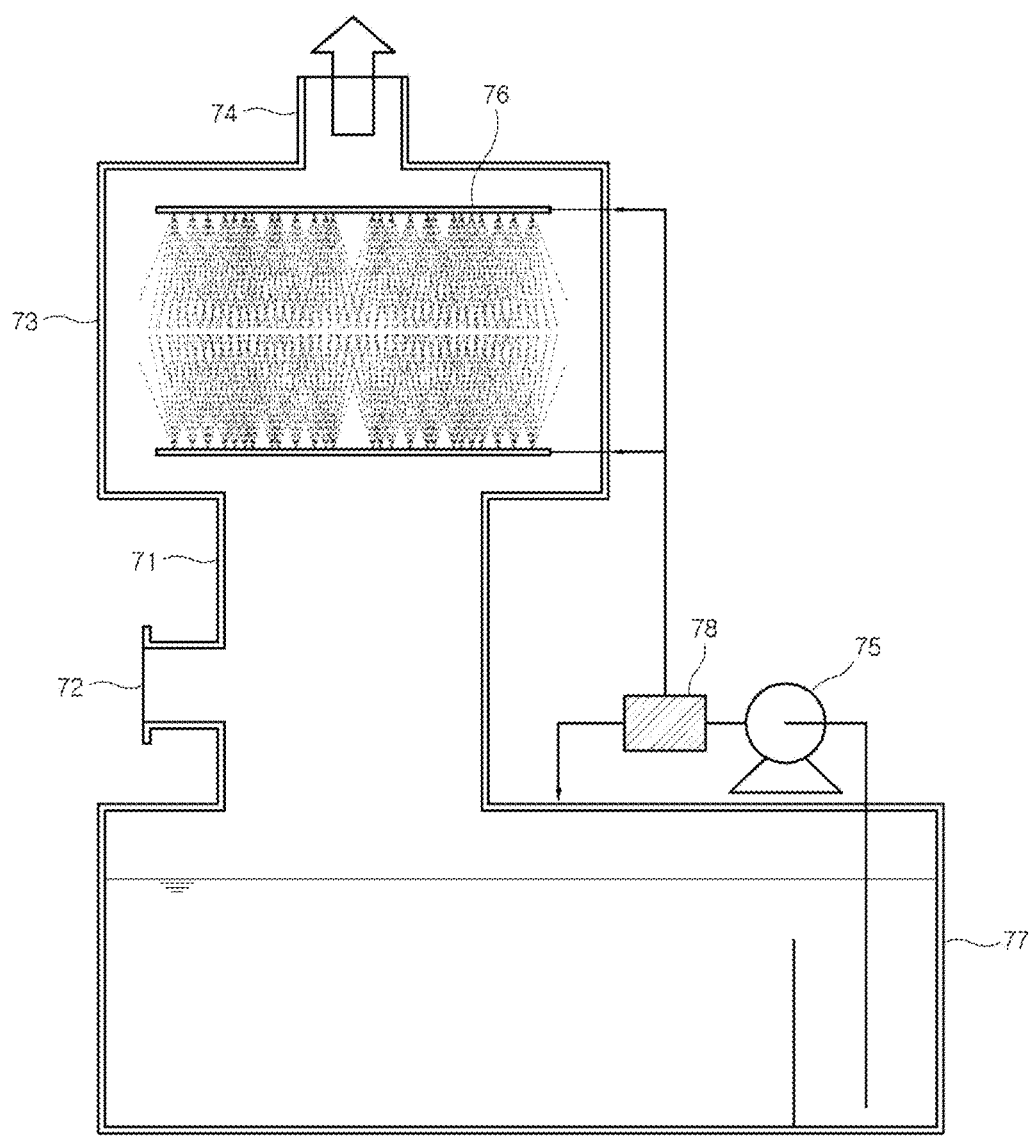
FIG. 10 is a view schematically illustrating a structure of an air purification apparatus.

FIG. 10 is a view schematically illustrating a structure of the air purification apparatus 600, and the air purification apparatus 600 includes a purification apparatus body 71; a gas input hole 72 which is installed on a side surface of the purification apparatus body 71 and to which gas transported from the drying vacuum pumps 57 and 63 input; a collection section 73 for removing harmful components in the gas as the gas input through the gas input hole 72 comes into contact with sprayed water; an outlet 74 for discharging clean air from which harmful components in the gas are removed from the collection section 73 to the outside; a pump 75 for spraying water into the collection section 73; a pair of spray nozzles 76 that is installed in the collection section 73 and receives water from the pump 75 to spray the water in the vertical direction while facing each other; a water tank 77 in which water sprayed in the collection section 73 flows and collects; and a water processing filter 78 for filtering water circulating in the air purification apparatus 600.

All materials consist of atoms, the atom consists of a positively charged central nucleus and a negatively charged electron circling the nucleus, and when two materials collide with each other, some of the electrons in the atoms of one material move freely without being bound to any atom between two atoms, and at this time, while the two atoms in contact with each other are separated from each other, a positively charged atom from which an electron is separated, and a negatively charged atom to which the electron is absorbed are partially generated.

The air purification apparatus 600 generates static electricity by strongly colliding water by using an ionization phenomenon in which the static electricity is generated by collision of water, and the generated static electricity decomposes harmful material particles or is removed by coupling to harmful component particles.

That is, while water ejected from upper and lower high-pressure spray nozzles facing each other collides with each other, high collision energy is generated, particles of water are micronized by the high collision energy to generate static electricity, and thereby, a large amount of radicals are continuously generate and dissipated.

In addition, the micronized particles of water form a water film to increase a contact area with gas particles passing through the collection section 73 and to maintain a long contact time, and thus, efficiency of removing harmful component particles may increase.

As described above, the air purification apparatus 600 includes a water film filter in which micro particles of water and radical are generated by water sprayed from the spray nozzle 76 in the collection section 73, the generated radical performs an ionizing reaction with gas, water vapor, and so on which are transported from the drying vacuum pumps 57 and 63 to decompose harmful components, the harmful components are collected by the water film filter to be stored in the water tank 77.

The longer the operation time of the air purification apparatus 600, the more the harmful components (including foreign matters) collected in water increase, and the increased harmful components hinder generation of static electricity and formation of a water film in the collection section 73 and increases content of the harmful components in clean gas discharged from the outlet 74, and also, foreign matters contained in the harmful components block the water processing filter 78 to hinder a continuous operation of the air purification apparatus 600.

Figure 11:
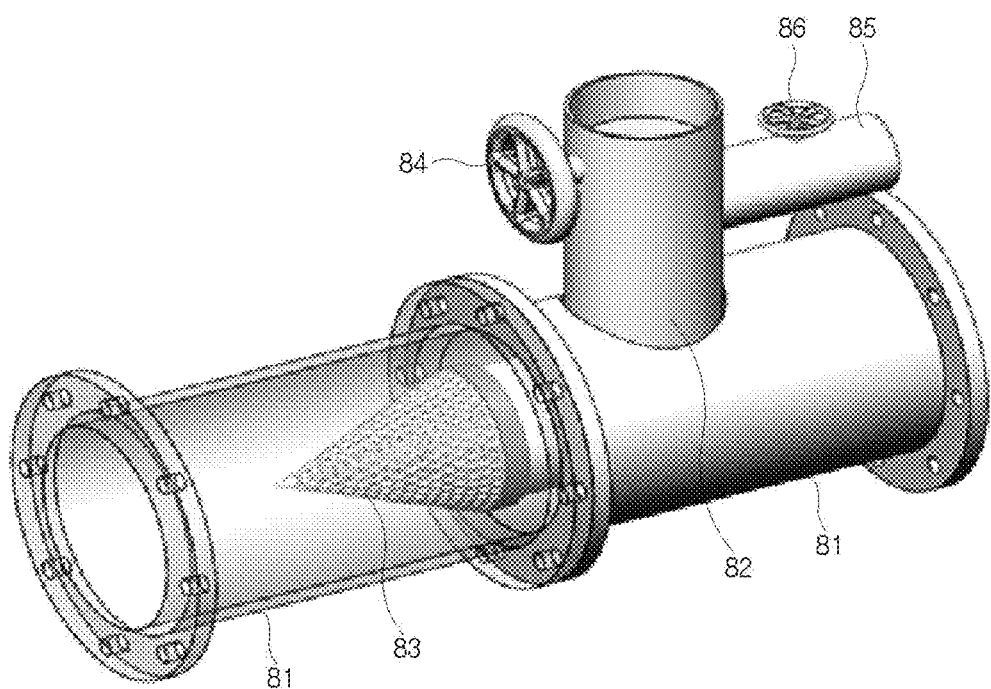
FIG. 11 is a combined perspective view of a water treatment filter installed in the air purification apparatus.
Figure 12:
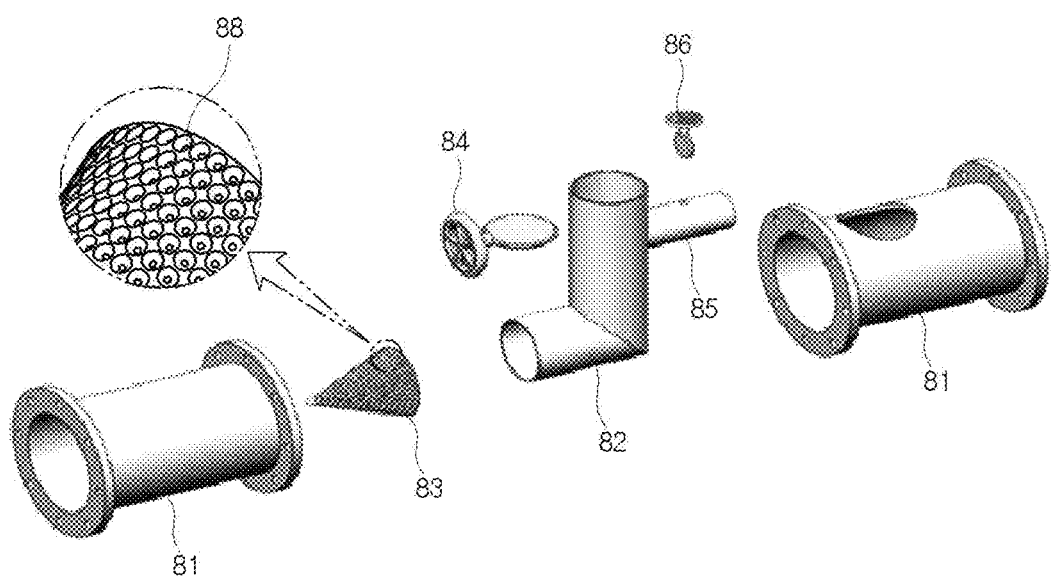
FIG. 12 is an exploded view of the water treatment filter of FIG. 11.

The water processing filter 78 filters water circulating in the air purification apparatus 600 to remove foreign matters from the water, and thus, the continuous operation of the air purification apparatus 600 and the content of harmful components in the clean gas is maintained below a standard value, and FIGS. 11 and 12 illustrate one embodiment of a water processing filter 78 according to the present disclosure.

The water processing filter 78 includes a liquid flow pipe 81 through which water containing foreign matters passes; a branch pipe 82 having an upstream end disposed in the liquid flow pipe 81 and a downstream end disposed outside the liquid flow pipe 81; a filtration net 83 that is mounted on the upstream end of the branch pipe 82 and has multiple micro through-holes 88 formed in a thickness direction and in which the micro through-hole 88 has a taper shape of which a diameter gradually narrows in a water flow direction; a first valve 84 installed in a downstream end of the branch pipe 82; a gas supply pipe 85 having one end coupled to an upstream side of the first valve 84 in a downstream end of the branch pipe 82 and having the other end coupled to a gas supply source (not illustrated); and a second valve 86 installed in the middle of the gas supply pipe 85.

The multiple micro through-holes 88 are formed in the filtration net 83, and the filtration net 83 may be formed by bending a metal plate in a conical shape or may have a hollow conical shape formed by injection molding with resin so that an apex is disposed on an upstream side in a fluid flow direction, and the micro through-hole 88 has a tapered shape that is opened in a thickness direction of the filtration net 83 and narrows in diameter from an upstream end to a downstream end.

A diameter of the upstream end of each of the micro through-holes 88 may be 10 to 100 μm, a diameter of the downstream end may be 1 to 10 μm, adjacent micro through-holes 88 may be formed in a lattice pattern with an interval of 1 μm or less, and a ratio between a diameter on a base side of the conical filtration net 83 and a length thereof in a water flow direction may be 1:1.5 to 2.5.

In the water processing filter 78 configured as described above, an upstream end of the liquid flow pipe 81 is coupled to an ejection portion of the pump 75 and a downstream end is coupled to the water tank 77, and thus, water in the water tank 77 circulates in the pump 75 and the water processing filter 78, and the water from which foreign matters are removed is supplied to the spray nozzle 76 through the branch pipe 82 to collect the harmful components in the gas input to the air purification apparatus 600.

Looking at an operation of the water processing filter 78 in more detail, when the pump 75 operates in a state where the first valve 84 is opened and the second valve 86 is closed, water containing solid foreign matter is input to an upstream end of the liquid flow pipe 81 from the water tank 77 by the pump 75 to face the filtration net 83, water (water from which foreign matters are filtered) passing through the multiple micro through-holes 88 of the filtration net 83 among the water transported toward the filtration net 83 is supplied to the spray nozzle 76 through the branch pipe 82 of the water processing filter 78, and water (water containing foreign matters) that does not pass through the micro through-holes 88 of the filtration net 83 returns to the water tank 77 via a downstream end of the liquid flow pipe 81.

If this state is continued, solid foreign matters may be stuck to the multiple micro through-holes 88 having a tapered shape, but since the micro through-holes 88 have the tapered shape, a contact area between water flowing through an outer surface of the filtration net 83 because the water does not pass through the filtration net 83 and foreign matters stuck in the micro through-holes 88 is smaller than a contact area between water passing through the filtration net 83 and the foreign matters stuck in the micro through-holes 88.

As the result, a lift force is generated in the foreign matters stuck in multiple micropores to cause the foreign matters to be released from the micropores and then to return to the water tank 77, and thus, even when a filtering process for fluid is performed for a long time, the micro through-holes 88 formed in the filtration net 83 are not blocked, and thereby, the filtration process may be continuously performed without replacing and cleaning a filter.

When the air purification apparatus 600 operates for a long time, foreign matters may be stuck in the micro through-holes 88 of the filtration net 83, the foreign matters may not be removed from the micro through-holes 88 even by a lift force due to a difference in contact area between water and the foreign matters, and in this case, by closing the first valve 84 and opening the second valve 86, gas of a gas supply source reversely passes through the filtration net 83 via the gas supply pipe 85, and thereby, the filtration net 83 is cleaned, and through this process, the water processing filter 78 may continuously perform the filtration process without replacing or cleaning a filter.

A gas supply source coupled to the gas supply pipe 85 may supply air or inert gas through a separate blower, an upstream end of the gas supply pipe 85 may be coupled to ejection portions of the drying vacuum pumps 57 and 63 for transporting gas generated from the filter assembly 400 and/or the wood powder drying apparatus 500 to reversely clean the filtration net 83 with an ejection pressure of the drying vacuum pumps 57 and 63.

The water processing filter 78 may be installed on a pipe of the ejection portion of the pump 75 as illustrated in FIG. 10 or may be installed inside the water tank 77 of an input portion of the pump 75 although not illustrated in FIG. 10.

A facility for forming a wood plastic composite according to the present disclosure configured as described above may effectively separate and discharge gas, water vapor, and so on from wood powder and a polymer resin to increase physical properties of the wood plastic composite, and also, since the wood powder from which impurities such as moisture, gas, and lignin components are removed are used as raw materials, operation efficiency of the facility is increased, and harmful components generated in a process of forming the wood plastic composite are effectively removed, and thus, the facility does not adversely affect surrounding environment.

DESCRIPTION OF CODES

100: extruder, 200: side feeder block, 300: heater, 400: filter assembly, 500: wood powder drying apparatus, 600: air purification apparatus, 1: a polymer resin hopper, 2: body, 3: extruder screw, 7: side feeder block inlet, 8: side feeder block body, 12: gas outlet, 14: gas intake, 16: housing, 18: first flow channel, 18a: front end, 18b: rear end, 19: outer opening, 20: gas separation portion, 21: insertion hole, 22: vent ring, 23: gas discharge groove, 24: head, 25: nozzle, 27: molten liquid supply portion, 28: main body, 30: inflow hole, 32: support plate, 33: micro ejection hole, 34: second flow channel, 34a: front end, 34b: rear end, 35: flow channel protrusion jaw, 40: micro groove, 47: gas collection groove, 48: first protrusion jaw, 49: second protrusion jaw, 51: wood powder hopper, 52: transport screw, 53: alumina pipe, 54: microwave generator, 55: waveguide, 56: drying housing, 57: drying vacuum pump, 58: drain pipe, 59: drain tank, 60: wood powder outlet, 61: gas discharge pipe, 62: gas suction pipe, 63: vacuum pump, 64: air filter, 71: purification apparatus body, 72: gas input hole, 73: collection section, 74: outlet, 75: pump, 76: spray nozzle, 77: water tank, 78: water processing filter, 81: liquid flow pipe, 82: branch pipe, 83: filtration net, 84: first valve, 85: gas supply pipe, 86: second valve, 88: through-hole, t: gap, W1: first wedge, W2: second wedge, P: peak, h: overflow hole, S: inclined surface

What is claimed is:

1. A facility for forming a wood plastic composite comprising:

an extruder that melts a polymer resin and extrudes the melted polymer resin;

a side feeder block that combines wood powder with the polymer resin extruded from the extruder and extrudes the combined wood powder and polymer resin to outside;

a heater that is installed on outer circumferential surfaces of the extruder and the side feeder block to heat the polymer resin and the wood powder;

a filter assembly that receives the powder and the polymer resin extruded from the side feeder block and discharges gas generated from a molten liquid of the wood powder and the polymer resin to outside;

a wood powder drying apparatus that dries the wood powder and supplies the dried wood powder to the side feeder block; and an air purification apparatus that removes harmful components in a gas discharged from the filter assembly and the wood powder drying apparatus and discharges clean gas to outside.

2. The facility for forming the wood plastic composite according to claim 1, wherein the filter assembly includes:

a housing that has one side on which the molten liquid supply portion is mounted and through which the molten liquid is supplied, and that includes a gas intake and a gas outlet;

a gas separation portion that is disposed in a longitudinal direction in a hollow formed inside the housing and has multiple flow channels formed on a surface thereof in a diagonal shape in the longitudinal direction so as to discharge gas contained in the molten liquid in a process in which the molten liquid flows through the flow channels in a diagonal direction;

multiple vent rings that are tightly coupled to an outer circumferential surface of the gas separation portion to seal radially outer openings of the flow channels and thereby preventing the molten liquid from leaking so that the molten liquid flows in the longitudinal direction and the gas contained in the molten liquid is discharged through a micro path; and a head that is coupled to other side of the housing to discharge the molten liquid passing through the gas separation portion and presses the multiple vent rings to come into close contact with each other.

3. The facility for forming the wood plastic composite according to claim 2, wherein the gas separation portion includes:

a main body;

a multiple flow channels are concavely formed in the diagonal direction in the longitudinal direction on an outer circumferential surface of the main body to cause the molten liquid to flow; and a support plate that is radially disposed at one side end of the main body and has multiple inflow hole formed at regular intervals in a circumferential direction and corresponds to the multiple flow channels so as to cause the molten liquid supplied through the molten liquid supply.

4. The facility for forming the wood plastic composite according to claim 3, wherein the multiple flow channels 18 and 34 includes:

first flow channels formed concavely in the diagonal direction on a surface of the main body;

second flow channels that alternate with the first flow channels and are arranged side by side and adjacent to the first flow channels to cause molten liquid overflow; and flow channel protruding jaws which protrude between the first and second flow channels to distinguish the first and second flow channels and have overflow holes h formed at peaks thereof to enable the molten liquid of the first flow channels to overflow to the second flow channels, wherein the multiple first and second flow channels and multiple flow channel protruding jaws are repeatedly arranged along a circumferential surface of the main body.

5. The facility for forming the wood plastic composite according to claim 4, wherein an opening hole is formed at a rear end of the first flow channel to correspond to the inflow hole of the support plate, and an inclined surface is formed at a front end, and wherein the inclined surface is formed at a rear end of the second flow channel and an open hole is formed at a front end thereof.

6. The facility for forming the wood plastic composite according to claim 5, wherein a micro ejection hole through which a part of the molten liquid is ejected to the head is formed on the inclined surface of the front end of the first flow channel.

7. The facility for forming the wood plastic composite according to claim 2, wherein each of the multiple vent rings includes:
an insertion holes formed inside a radius of a ring shape;
a first protruding jaw that protrudes on a front surface of the multiple vent rings in a circumferential direction around the insertion hole, has a radial micro path formed on a surface thereof, and come into contact with a rear surface of an adjacent vent ring to cause a rim of the multiple vent rings to be separated from a rim of the adjacent vent ring by a predetermined distance; and
a gas discharge groove formed concavely on a circumferential surface of the vent ring in the longitudinal direction to become a gas discharge path, and wherein the gas separation portion sequentially passes through the insertion holes, the multiple vent rings are tightly coupled to the outer circumferential surface of the gas separation portion to seal openings 19 outside radiuses of the multiple flow channels so that gas contained in the molten liquid flowing through the flow channels sequentially passes through a gap t between the first protruding jaw, the gas discharge groove, and the gas outlet to be discharged to outside.

8. The facility for forming the wood plastic composite according to claim 2, each of the multiple vent rings includes:
an insertion hole formed inside a radius of a ring shape;
a first protruding jaw that protrudes from a front surface of the vent ring in a circumferential direction around the insertion hole, has a radial micro path formed on a surface thereof, and come into contact with a rear surface of the adjacent vent ring to cause a rim of the vent ring to be separated from a rim of the adjacent vent ring by a predetermined distance;
a second protruding jaw that is formed to protrude on a front surface of the vent ring in a circumferential direction around the rim of the vent ring, is disposed to be separated from the first protruding jaw by a predetermined distance, and has a smaller protruding length than the first protruding jaw;
a gas collection groove formed between the first and second protruding jaws to collect gas; and a gas discharge groove formed concavely in a circumferential surface of the vent ring in the longitudinal direction to become a gas discharge path, and wherein the gas separation portion sequentially passes through the insertion holes, the vent rings are tightly coupled to the outer circumferential surface of the gas separation portion to seal openings outside radiuses of the multiple flow channels so that gas contained in the molten liquid flowing through the flow channels sequentially passes through the gas collection groove, the gas discharge groove, and the gas outlet to be discharged to outside.

9. The facility for forming the wood plastic composite according to claim 1, wherein the wood powder drying apparatus includes:
a wood powder hopper that contains wood powder;
an alumina pipe in which a movement path of the wood powder is formed and an opening is formed in an upper portion;
a transport screw that is contained in a wood powder movement path of the alumina pipe to transport the wood powder supplied from the wood powder hopper;
a drying housing in which the alumina pipe is contained and a drain pipe is connected to a lower portion;
a microwave generator that generates microwaves and supplies the microwaves into the drying housing through a waveguide;
a drain tank connected to the drying housing through the drain pipe;
a dry vacuum pump connected to the drain tank to discharge gas generated from the wood powder to outside; and
a wood powder outlet that is installed at a rear end of the alumina pipe to discharge the wood powder transported by the transport screw.

10. The facility for forming the wood plastic composite according to claim 1, wherein the air purification apparatus includes:
a purification apparatus body;
a gas input hole which is installed on a side of the purification apparatus body and into which gas transported from the vacuum pumps flows;
a collection section in which the gas flowing into the gas input hole comes into contact with sprayed water to remove harmful components in the gas;
an outlet for discharging clean air from which the harmful components in the gas are removed in the collection section to outside;
a pump that sprays water into the collection section;
a pair of spray nozzles that is installed in the collection section and receives water from the pump to spray the water in a vertical direction while facing each other;
a water tank in which the water sprayed inside the collection section flows and is collected; and
a water processing filter for filtering water circulating in the apparatus.

11. The facility for forming the wood plastic composite according to claim 10, wherein the water processing filter includes:
a liquid flow pipe through which water containing foreign matters passes;
a branch pipe having an upstream end disposed in the liquid flow pipe and a downstream end disposed outside the liquid flow pipe;
a filtration net that is mounted at an upstream end of the branch pipe and has multiple through-holes formed in a thickness direction, each through-hole having a tapered shape in which a diameter gradually narrows in a flow direction of water;
a first valve installed at a downstream end of the branch pipe;
a gas supply pipe having one end coupled to an upstream side of the first valve at the downstream end of the branch pipe and the other end coupled to a gas supply source; and
a second valve installed in the middle of the gas supply pipe.

\* \* \* \* \*